United States Patent
Jin et al.

(10) Patent No.: US 9,907,001 B2
(45) Date of Patent: Feb. 27, 2018

(54) METHOD AND DEVICE FOR SWITCHING BETWEEN NETWORKS

(71) Applicant: HUAWEI DEVICE (DONGGUAN) CO., LTD., Dongguan (CN)

(72) Inventors: Hui Jin, Beijing (CN); Guodong Xue, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 272 days.

(21) Appl. No.: 14/700,966

(22) Filed: Apr. 30, 2015

(65) Prior Publication Data
US 2015/0237551 A1    Aug. 20, 2015

Related U.S. Application Data

(63) Continuation of application No. PCT/CN2012/083840, filed on Oct. 31, 2012.

(51) Int. Cl.
*H04W 4/00* (2009.01)
*H04W 36/14* (2009.01)
(Continued)

(52) U.S. Cl.
CPC .......... *H04W 36/14* (2013.01); *H04W 48/02* (2013.01); *H04W 48/16* (2013.01); *H04W 48/18* (2013.01); *H04W 36/16* (2013.01)

(58) Field of Classification Search
CPC ........................................ H04W 36/14–36/22
See application file for complete search history.

(56) References Cited

U.S. PATENT DOCUMENTS 8,626,165 B1 * 1/2014 Narasimhan .......... H04W 36/14
                                                                    370/252
2002/0028669 A1    3/2002 Rhawi
(Continued)

FOREIGN PATENT DOCUMENTS

CN    101505510 A    8/2009
CN    102076124 A    5/2011
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331, V11.1.0, Technical Specification, Sep. 23, 2012, 325 pages.

(Continued)

*Primary Examiner* — Jutai Kao
(74) *Attorney, Agent, or Firm* — Conley Rose, P.C.

(57) ABSTRACT

A method and device for switching between networks, where the method includes, if a notification that a signal of a first operator network is lost is received from a user equipment (UE), sending a temporary operational profile (OP) request to a remote management platform of a second operator network; receiving a temporary OP and a validity period of the temporary OP; instructing the UE to detect signal strength of the first operator network, and accessing the second operator network using the temporary OP; and before the validity period of the temporary OP expires, if it is determined according to the signal strength of the first operator network that the signal of the first operator network is recovered, re-accessing the first operator network.

20 Claims, 8 Drawing Sheets

(51) Int. Cl.
*H04W 48/02* (2009.01)
*H04W 48/16* (2009.01)
*H04W 48/18* (2009.01)
*H04W 36/16* (2009.01)

(56) References Cited

U.S. PATENT DOCUMENTS

| | | | |
|---|---|---|---|
| 2011/0269503 A1 | 11/2011 | Park et al. | |
| 2012/0009972 A1* | 1/2012 | Viering | H04W 36/22 455/525 |
| 2012/0108206 A1 | 5/2012 | Haggerty | |
| 2012/0258710 A1* | 10/2012 | Swaminathan | H04W 48/16 455/433 |
| 2013/0231087 A1* | 9/2013 | O'Leary | H04W 8/22 455/411 |
| 2014/0204909 A1* | 7/2014 | Cheng | H04W 8/082 370/331 |

FOREIGN PATENT DOCUMENTS

| | | |
|---|---|---|
| CN | 102238701 A | 11/2011 |
| CN | 102457834 A | 5/2012 |
| EP | 1703760 A2 | 9/2006 |
| EP | 2448301 A1 | 5/2012 |

OTHER PUBLICATIONS

Foreign Communication From a Counterpart Application, European Application No. 12887532.5, Extended European Search Report dated Oct. 29, 2015, 13 pages.
Partial English Translation and Abstract of Chinese Patent Application No. CN101505510A, May 7, 2015, 7 pages.
Partial English Translation and Abstract of Chinese Patent Application No. CN102076124A, 2015, 6 pages.
Foreign Communication From a Counterpart Application, PCT Application No. PCT/CN2012/083840, English Translation of International Search Report dated Aug. 8, 2013, 2 pages.
Foreign Communication From a Counterpart Application, PCT Application No. PCT/CN2012/083840, English Translation of Written Opinion dated Aug. 8, 2013, 17 pages.

* cited by examiner

METHOD AND DEVICE FOR SWITCHING BETWEEN NETWORKS

CROSS-REFERENCE TO RELATED APPLICATIONS

This application is a continuation of International Application No. PCT/CN2012/083840, filed on Oct. 31, 2012, which is hereby incorporated by reference in its entirety.

TECHNICAL FIELD

The present invention relates to communications technologies, and in particular, to a method and device for switching between networks.

BACKGROUND

When using a network of a mobile network operator (MNO), subscribers may encounter the following situation: when a subscriber that belongs to an MNO1 (for example, China Mobile) but does not belong to an MNO2 (for example, China Unicom) moves to a location (for example, a blind area of the MNO1) not covered by an MNO1 signal but covered by an MNO2 signal, the subscriber cannot continue to use a network of the MNO1 to perform communication, which causes great inconvenience to the subscriber especially if the subscriber has an important call.

To deal with this situation, the prior art puts forward a solution for temporarily using another MNO. When a user equipment (UE) detects a loss of contact with the current MNO network, the UE notifies an embedded universal integrated circuit card (eUICC) that is embedded in the UE about another available MNO detected by the UE, where the other available MNO may be referred to as a second operator network, and the network with which the UE has lost contact may be referred to as a first operator network. The eUICC learns a remote management platform of the second operator network according to information about the second operator network provided by the UE, where the remote management platform includes a subscription manager-secure routing unit (SM-SR) and a subscription manager-data preparing unit (SM-DP). Then, the eUICC instructs the UE to send a request for temporary operational profile (OP) to the SM-SR, where the OP is a series of files required for using an MNO network. The SM-SR of the second operator network requests a temporary OP from the SM-DP after the eUICC is authenticated by an SM-SR of the first operator network. The SM-DP allocates a temporary OP, and sends the temporary OP to the eUICC through the SM-SR of the second operator network. The eUICC instructs the UE to access the second operator network using the temporary OP, so that the UE begins to use the second operator network without having to miss important calls.

There is a need for a method whereby the UE can switch from the second operator network back to the first operator network when network signals of the first operator network are recovered.

SUMMARY

The present invention provides a method and device for switching between networks, so that a UE can switch back to a first operator network when a signal of the first operator network is recovered.

A first aspect of the present invention provides a method for switching between networks, including: if a notification that a signal of a first operator network is lost is received from a UE, determining an available second operator network, and sending a temporary OP request to a remote management platform of the second operator network; receiving a temporary OP and a validity period of the temporary OP that are returned by the remote management platform of the second operator network; and instructing the UE to detect signal strength of the first operator network, and accessing the second operator network using the temporary OP; and before the validity period of the temporary OP expires, if it is determined according to the signal strength of the first operator network that the signal of the first operator network is recovered, re-accessing the first operator network.

With reference to the first aspect, in a first possible implementation, the temporary OP request sent to the remote management platform of the second operator network carries first indication information; and the validity period of the temporary OP returned by the remote management platform is determined by the remote management platform according to the first indication information.

With reference to the first possible implementation of the first aspect, in a second possible implementation, the first indication information includes reason information for sending the temporary OP request; and the validity period of the temporary OP returned by the remote management platform is determined by the remote management platform according to the reason information.

With reference to the first aspect, in a third possible implementation, after the instructing the UE to detect signal strength of the first operator network, the method further includes, if the validity period of the temporary OP expires without receipt of a notification from the UE that the signal of the first operator network is recovered, sending a temporary OP update request to the remote management platform; receiving a temporary OP update response returned by the remote management platform, where the temporary OP update response carries a new temporary OP or a new validity period that is allocated by the remote management platform; and continuing to use the second operator network using the new temporary OP or according to the new validity period.

With reference to the first aspect, in a fourth possible implementation, the re-accessing the first operator network includes activating an OP of the first operator network, deactivating the temporary OP allocated by the second operator network, and starting a delete timer, where the delete timer is used to set a deletion period required for detecting whether the first operator network is stable; and re-accessing the first operator network using the OP of the first operator network.

With reference to the fourth possible implementation of the first aspect, in a fifth possible implementation, after the starting a delete timer, the method further includes, if a notification that the signal of the first operator network is lost is received from the UE before both the deletion period and the validity period of the temporary OP expire, re-accessing the second operator network using the temporary OP, and stopping the delete timer.

With reference to the fourth possible implementation of the first aspect, in a sixth possible implementation, after the starting a delete timer, the method further includes, if the deletion period expires but the validity period of the temporary OP does not expire, and a notification that the signal of the first operator network is lost is not received from the UE, deleting the temporary OP allocated by the second operator network and stored by the eUICC; and sending a temporary OP deletion request to the remote management platform of the second operator network, to instruct the remote management platform to delete the temporary OP.

With reference to the fourth possible implementation of the first aspect, in a seventh possible implementation, after the starting a delete timer, the method further includes, if the validity period of the temporary OP expires prior to the deletion period, sending no temporary OP update request to the remote management platform of the second operator network, and stopping the delete timer.

With reference to the first aspect, in an eighth possible implementation, after the instructing the UE to detect signal strength of the first operator network, the method further includes, after the validity period of the temporary OP expires, if it is determined according to the signal strength of the first operator network that the signal of the first operator network is recovered, re-accessing the first operator network.

A second aspect of the present invention provides a method for switching between networks, including receiving a temporary OP request sent by an eUICC, where the temporary OP request is sent by the eUICC according to a notification sent by a UE to indicate to the eUICC that a signal of a first operator network is lost; and returning a temporary OP and a validity period of the temporary OP to the eUICC, so that the eUICC accesses a second operator network using the temporary OP, and if the signal of the first operator network that the eUICC instructs the UE to detect is recovered before the validity period expires, re-accesses the first operator network.

With reference to the second aspect, in a first possible implementation, the received temporary OP request sent by the eUICC carries first indication information; and before the returning a validity period of the temporary OP to the eUICC, the method further includes determining the validity period of the temporary OP according to the first indication information.

With reference to the first possible implementation of the second aspect, in a second possible implementation, the first indication information includes reason information for sending the temporary OP request; and the determining the validity period of the temporary OP according to the first indication information is determining the validity period of the temporary OP according to the reason information.

With reference to the second aspect, in a third possible implementation, after the returning a temporary OP and a validity period of the temporary OP to the eUICC, the method further includes receiving a temporary OP update request sent by the eUICC, where the temporary OP update request is sent by the eUICC when the validity period expires without receipt of a notification from the UE that the signal of the first operator network is recovered; and returning a temporary OP update response to the eUICC, where the temporary OP update response carries an allocated new temporary OP or new validity period, so that the eUICC continues to use the second operator network using the new temporary OP or according to the new validity period.

With reference to the third possible implementation of the second aspect, in a fourth possible implementation, the temporary OP update request carries the temporary OP; and after the receiving a temporary OP update request sent by the eUICC, and before the returning a temporary OP update response to the eUICC, the method further includes checking whether the temporary OP carried in the temporary OP update request is an OP in an activated state in the eUICC; if yes, allocating the new temporary OP or the new validity period to the eUICC; or if no, deleting the temporary OP, and returning no temporary OP update response to the eUICC.

With reference to the second aspect, in a fifth possible implementation, after the returning a temporary OP and a validity period of the temporary OP to the eUICC, the method further includes receiving a temporary OP deletion request sent by the eUICC, where the temporary OP deletion request is sent by the eUICC when a deletion period expires on the eUICC side without receipt of a notification from the UE that the signal of the first operator network is lost; and deleting, according to the temporary OP deletion request, the temporary OP corresponding to the eUICC.

A third aspect of the present invention provides an eUICC, including an operator determining unit, a temporary OP acquiring unit, a signal detection instructing unit, and an operator access unit, where the operator determining unit is configured to, when a notification that a signal of a first operator network is lost is received from a UE, determine an available second operator network; the temporary OP acquiring unit is configured to send a temporary OP request to a remote management platform of the second operator network, and receive a temporary OP and a validity period of the temporary OP that are returned by the remote management platform of the second operator network; the signal detection instructing unit is configured to instruct the UE to detect signal strength of the first operator network; and the operator access unit is configured to access the second operator network using the temporary OP; and is further configured to, before the validity period of the temporary OP expires, if it is determined according to the signal strength of the first operator network that the signal of the first operator network is recovered, re-access the first operator network.

With reference to the third aspect, in a first possible implementation, the temporary OP request sent by the temporary OP acquiring unit carries first indication information, so that the remote management platform determines the validity period of the temporary OP according to the first indication information.

With reference to the first possible implementation of the third aspect, in a second possible implementation, the first indication information is reason information for sending the temporary OP request.

With reference to the third aspect, in a third possible implementation, the temporary OP acquiring unit is further configured to, when the validity period expires without the operator determining unit receiving a notification from the UE that the signal of the first operator network is recovered, send a temporary OP update request to the remote management platform; and receive a temporary OP update response returned by the remote management platform, where the temporary OP update response carries a new temporary OP or a new validity period that is allocated by the remote management platform; and the operator access unit is further configured to continue to use the second operator network using the new temporary OP or according to the new validity period.

With reference to the third aspect, in a fourth possible implementation, the operator access unit includes an OP management subunit configured to activate an OP of the first operator network, and deactivate the temporary OP allocated by the second operator network; a timer management subunit configured to start a delete timer, where the delete timer is used to set a deletion period required for detecting whether the first operator network is stable; and a network access subunit configured to re-access the first operator network using the OP of the first operator network.

With reference to the fourth possible implementation of the third aspect, in a fifth possible implementation, the operator determining unit is further configured to, before both the deletion period and the validity period of the temporary OP expire, receive a notification from the UE that the signal of the first operator network is lost; the OP management subunit is further configured to deactivate the OP of the first operator network, and activate the temporary OP allocated by the second operator network; the network access subunit is further configured to re-access the second operator network using the temporary OP; and the timer management subunit is further configured to stop the delete timer.

With reference to the fourth possible implementation of the third aspect, in a sixth possible implementation, the OP management subunit is further configured to, if the deletion period expires but the validity period of the temporary OP does not expire, and the operator determining unit does not receive a notification from the UE that the signal of the first operator network is lost, delete the temporary OP allocated by the second operator network and stored by the eUICC; and the temporary OP acquiring unit is further configured to send a temporary OP deletion request to the remote management platform of the second operator network, to instruct the remote management platform to delete the temporary OP.

With reference to the fourth possible implementation of the third aspect, in a seventh possible implementation, the temporary OP acquiring unit is further configured to, when the validity period of the temporary OP expires prior to the deletion period, send no temporary OP update request to the remote management platform of the second operator network; and the timer management subunit in the operator access unit is further configured to stop the delete timer.

With reference to the fourth possible implementation of the third aspect, in an eighth possible implementation, the operator access unit is further configured to, after the validity period of the temporary OP expires, if it is determined according to the signal strength of the first operator network that the signal of the first operator network is recovered, re-access the first operator network.

A fourth aspect of the present invention provides a remote management platform, including a SM-SR and a SM-DP, where the SM-SR is configured to receive a temporary OP request sent by an eUICC, where the temporary OP request is sent by the eUICC according to a notification sent by a UE to indicate to the eUICC that a signal of a first operator network is lost; and forward the temporary OP request to the SM-DP; and the SM-DP is configured to return a temporary OP and a validity period of the temporary OP to the eUICC through the SM-SR, so that the eUICC accesses a second operator network using the temporary OP, and if the signal of the first operator network that the eUICC instructs the UE to detect is recovered before the validity period expires, re-accesses the first operator network.

With reference to the fourth aspect, in a first possible implementation, the temporary OP request sent by the eUICC and received by the SM-SR carries first indication information; and the SM-DP is further configured to, before returning the validity period of the temporary OP to the eUICC, determine the validity period of the temporary OP according to the first indication information.

With reference to the first possible implementation of the fourth aspect, in a second possible implementation, the first indication information includes reason information for sending the temporary OP request.

With reference to the fourth aspect, in a third possible implementation, the SM-SR is further configured to receive a temporary OP update request sent by the eUICC, where the temporary OP update request is sent by the eUICC when the validity period expires without receipt of a notification from the UE that the signal of the first operator network is recovered, and forward the temporary OP update request to the SM-DP; and the SM-DP is configured to allocate a new temporary OP or a new validity period to the eUICC, add the new temporary OP or the new validity period to a temporary OP update response, and return the temporary OP update response to the eUICC through the SM-SR, so that the eUICC continues to use the second operator network using the new temporary OP or according to the new validity period.

With reference to the third possible implementation manner of the fourth aspect, in a fourth possible implementation manner, the temporary OP update request carries the temporary OP; the SM-SR is further configured to, after receiving the temporary OP update request sent by the eUICC, check whether the temporary OP carried in the temporary OP update request is an activated OP in the eUICC; if yes, forward the temporary OP update request to the SM-DP; or if no, instruct the SM-DP to delete the temporary OP.

With reference to the third possible implementation of the fourth aspect, in a fifth possible implementation, the SM-SR is further configured to receive a temporary OP deletion request sent by the eUICC, where the temporary OP deletion request is sent by the eUICC when a deletion period expires on the eUICC without receipt of a notification from the UE that the signal of the first operator network is lost; and forward the temporary OP deletion request to the SM-DP; and the SM-DP deletes, according to the temporary OP deletion request, the temporary OP corresponding to the eUICC.

A fifth aspect of the present invention provides a UE, including a processor and an eUICC, where the processor is configured to send, to the eUICC, a notification that a signal of a first operator network is lost; and the eUICC is configured to determine an available second operator network according to the notification that the signal of the first operator network is lost, and send a temporary OP request to a remote management platform of the second operator network through the processor; and is further configured to receive, through the processor, a temporary OP and a validity period of the temporary OP that are returned by the remote management platform of the second operator network, instruct the processor to detect signal strength of the first operator network, and access the second operator network using the temporary OP; and before the validity period of the temporary OP expires, if the processor determines according to the signal strength of the first operator network that the signal of the first operator network is recovered, re-access the first operator network.

The method and device for switching between networks according to the present invention achieves the following technical effects: a remote management platform sets a validity period for a temporary OP, and an eUICC instructs a UE to detect signal strength of a first operator network; in this way, before the validity period elapses, if it is determined according to the signal strength of the first operator network that a signal of the first operator network is recovered, the UE can re-access the first operator network, the UE can switch back to the first operator network when the signal of the first operator network is recovered.

DESCRIPTION OF EMBODIMENTS

Figure 1:
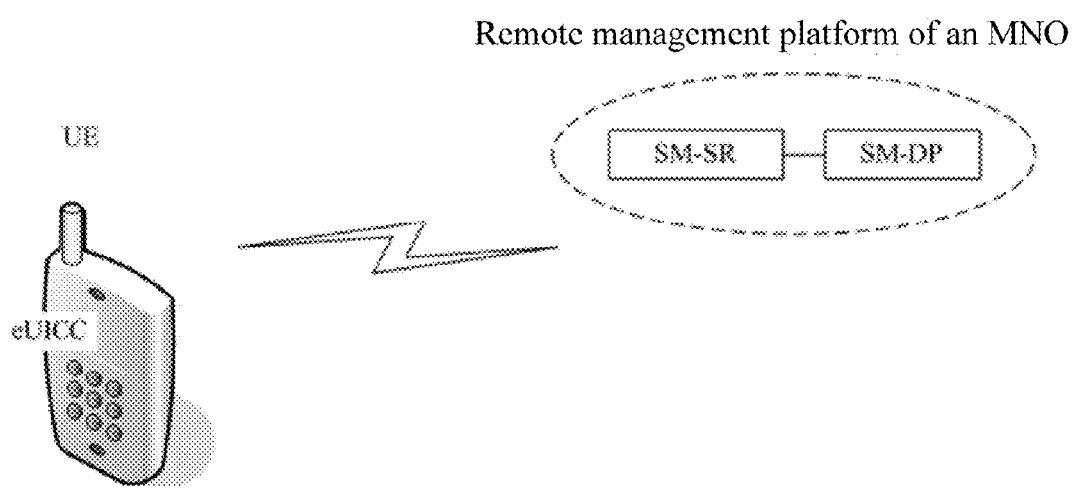
FIG. 1 is a system application diagram depicting an embodiment of a method for switching between networks according to the present invention.

Attention is first directed towards some concepts involved in embodiments of the present invention. The embodiments of the present invention describe a method for switching between networks of different MNOs by a UE in which an eUICC is installed. FIG. 1 is a system application diagram depicting an embodiment of a method for switching between networks according to the present invention. The figure shows a relationship between an eUICC, a UE, a remote management platform, and the like, where, eUICC: different from a conventional universal integrated circuit card (UICC). A conventional UICC is customized by an operator and is factory configured with relevant information of the operator. The information of the operator cannot be changed after the UICC leaves the factory. An eUICC is a UICC embedded in a UE, and can switch from one MNO to another by downloading relevant data of the target MNO, such as an OP. As long as an OP corresponding to the target MNO is downloaded, the eUICC may access a network of the MNO using the OP, thereby realizing MNO switching.

eUICC and UE: embedded in a UE, but does not have a radio frequency function, and consequently cannot send or receive signals to or from an external device. For example, in the event of a switch to an MNO, although the eUICC is installed with an OP corresponding to the MNO, it cannot access a network of the MNO. Rather, the eUICC instructs the UE to access the network of the MNO using the OP. For another example, the eUICC does not obtain an OP of a particular MNO by itself, and the eUICC instructs the UE to send an OP request to a remote management platform of the MNO. For the above reason, in the subsequent embodiments of the present invention, when it is mentioned that an eUICC accesses an MNO, it means that the eUICC instructs a UE to access an MNO using an OP.

Remote management platform: responsible for subscription management on the side of a MNO. For example, to access an MNO, an eUICC needs to acquire and install an OP of the MNO. The OP is prepared by the remote management platform and delivered to the eUICC, in other words, the eUICC needs to download the OP of the MNO from the remote management platform before accessing a network of the MNO using the OP.

The remote management platform includes an SM-SR and an SM-DP, where

SM-DP: responsible for allocating an OP, for preparing OP data. An SM-DP may allocate a corresponding OP to an eUICC according to a request from the eUICC, so that the eUICC may access, using the OP, a network of an MNO to which the SM-DP belongs; and SM-SR: responsible for file routing. An eUICC does not directly communicate with an SM-DP. It sends all relevant requests to an SM-SR, and the SM-SR forwards them to the SM-DP. For example, an OP request sent by the eUICC is sent to the SM-SR, and then forwarded by the SM-SR to the SM-DP; and the SM-SR may further forward an OP allocated by the SM-DP to the eUICC.

Based on the foregoing description, the following describes a method for enabling a UE to switch from a second operator network back to a first operator network when signals of the first operator network are recovered.

Embodiment 1

Figure 2:
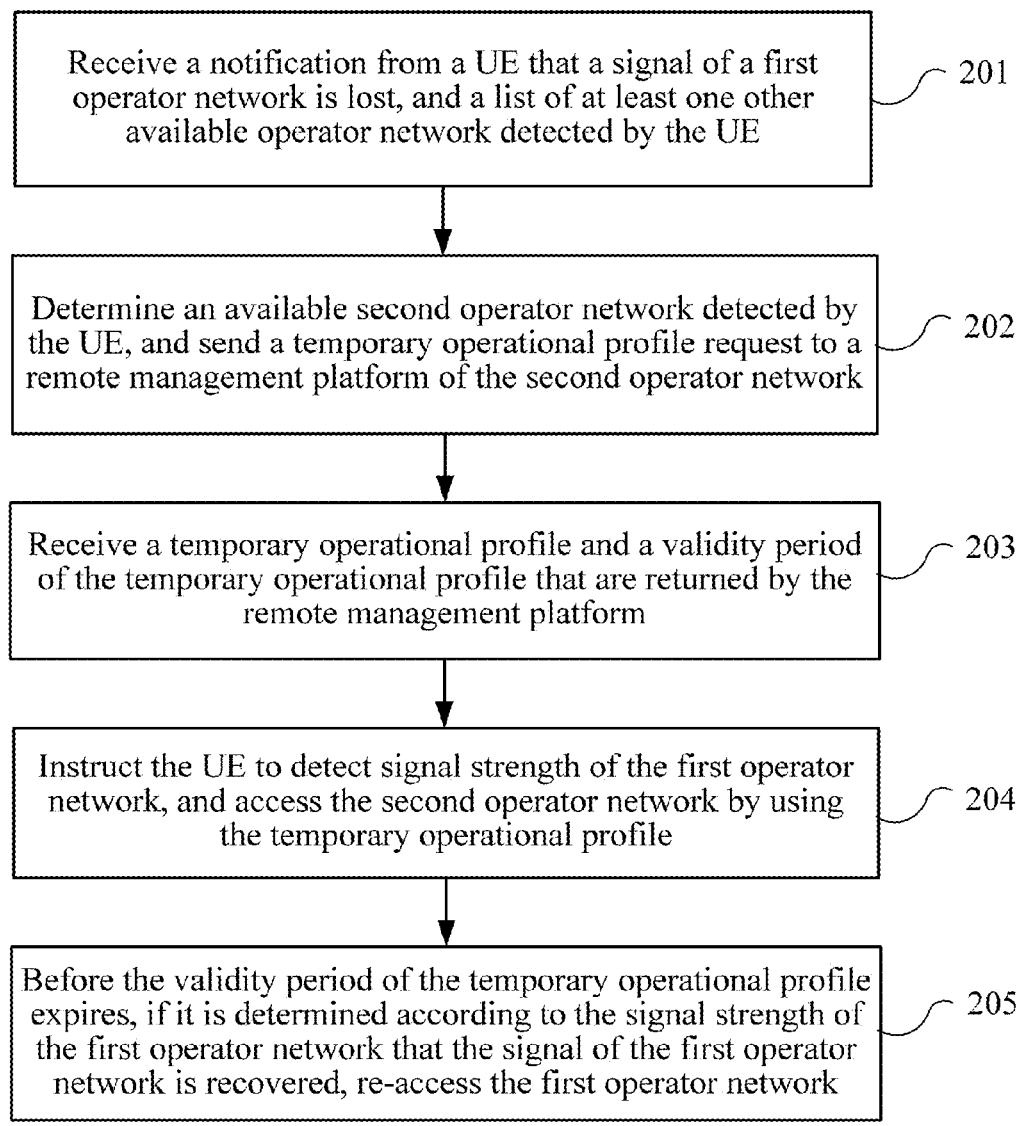
FIG. 2 is a schematic flowchart illustrating an embodiment of a method for switching between networks according to the present invention.

FIG. 2 is a schematic flowchart illustrating an embodiment of a method for switching between networks according to the present invention. The method is executed by an eUICC, and as shown in FIG. 2, the method may include the following steps:

201: Receive from a UE a notification that a signal of a first operator network is lost, and a list of at least one other available operator network detected by the UE.

When detecting that a network signal of a current MNO is lost, a UE notifies an eUICC that the signal of the MNO is lost, and in this embodiment, an MNO whose signal is lost is referred to as the first operator network. In addition, the UE further detects a signal of at least one other available MNO, and sends information about the at least one other MNO (which is referred to as a list of at least one other available MNO) to the eUICC.

202: Determine an available second operator network detected by the terminal (e.g. the UE), and send a temporary OP request to a remote management platform of the second operator network.

The step of determining a detected second operator network refers to selecting one MNO from a list of at least one detected available MNO reported by the UE. For example, it is assumed that the first operator network is China Mobile, and the UE detects that two other MNOs are available, namely, China Unicom and China Telecom. Then, the eUICC selects one MNO as a new MNO to be accessed by the UE. In this embodiment, the to-be-accessed MNO that is selected by the eUICC is referred to as the second operator network.

After determining the available second operator network, the eUICC needs to request an OP corresponding to the second operator network from the remote management platform of the second operator network. The OP allocated by the second operator network is a temporary OP, because the eUICC is registered with the first operator network and only temporarily resorts to the second operator network for a network access service after the signal of the first operator network is lost. As described above, the eUICC notifies the UE of information corresponding to the second operator network, for example, the eUICC notifies the UE of address information of an SM-SR in the remote management platform of the second operator network, and instructs the UE to send a temporary OP request to the SM-SR, to request a temporary OP corresponding to the second operator network (information about remote management platforms corresponding to MNOs is known to the eUICC).

Optionally, the temporary OP request may carry first indication information. When the remote management platform of the second operator network discovers the presence of the first indication information, it sets a validity period for an allocated temporary OP in addition to allocating the temporary OP. Within the validity period, the eUICC can access the second operator network using the temporary OP. After the validity period expires, the eUICC cannot continue to access the second operator network using the temporary OP.

Optionally, the first indication information may be reason information for sending the temporary OP request. For example, the reason information may be loss of current network coverage, roaming, or the like.

203: Receive a temporary OP and a validity period of the temporary OP that are returned by the remote management platform.

For example, the remote management platform of the second operator network returns a temporary OP response to the eUICC, where the response carries a temporary OP and a validity period of the temporary OP. In a specific implementation, an SM-DP in the remote management platform allocates the temporary OP and the validity period, and forwards the temporary OP and the validity period to the eUICC.

For example, when the first indication information carried in the temporary OP request is reason information for the request, the SM-DP may allocate a validity period corresponding to the reason information for the request. For example, when the reason for the request is loss of current network coverage, the validity period set by the SM-DP may be shorter than when the reason for the request is roaming.

204: Instruct the UE to detect signal strength of the first operator network, and access the second operator network using the temporary OP.

After receiving the information returned by the remote management platform, such as the temporary OP, the eUICC instructs the UE to continue to detect the signal strength of the first operator network; and the eUICC accesses the second operator network using the temporary OP, the eUICC instructs the UE to access the second operator network using the temporary OP.

205: Before the validity period of the temporary OP elapses, if it is determined according to the signal strength of the first operator network that the signal of the first operator network is recovered, re-access the first operator network.

For example, before the validity period elapses, if the eUICC receives from the UE a notification that the signal of the first operator network is recovered, the eUICC re-accesses the first operator network, the eUICC deactivates the temporary OP, activates an OP of the first operator network, and instructs the UE to re-access the first operator network using the OP of the first operator network.

In a specific implementation, the UE may determine, according to the detected signal strength of the first operator network, whether the network signal of the first operator network is recovered. For example, if the signal strength of the first operator network detected by the UE remains above a threshold for a period of time, it may be inferred that the network signal of the first operator network has recovered. The threshold and the duration may be set in the UE in advance, or may be sent by the eUICC to the UE, for example, when the eUICC instructs the UE to detect the signal strength of the first operator network in step 204, the eUICC may send the threshold and the duration to the UE at the same time.

In addition, after the validity period of the temporary OP expires, if it is determined according to the signal strength of the first operator network that the signal of the first operator network is recovered, the first operator network may also be re-accessed.

In the method for switching between networks according to this embodiment, a remote management platform sets a validity period for a temporary OP, and an eUICC instructs a UE to detect signal strength of a first operator network; in this way, before the validity period expires, if it is determined that a signal of the first operator network is recovered, the UE can switch back to the first operator network for network access.

Embodiment 2

Figure 3:
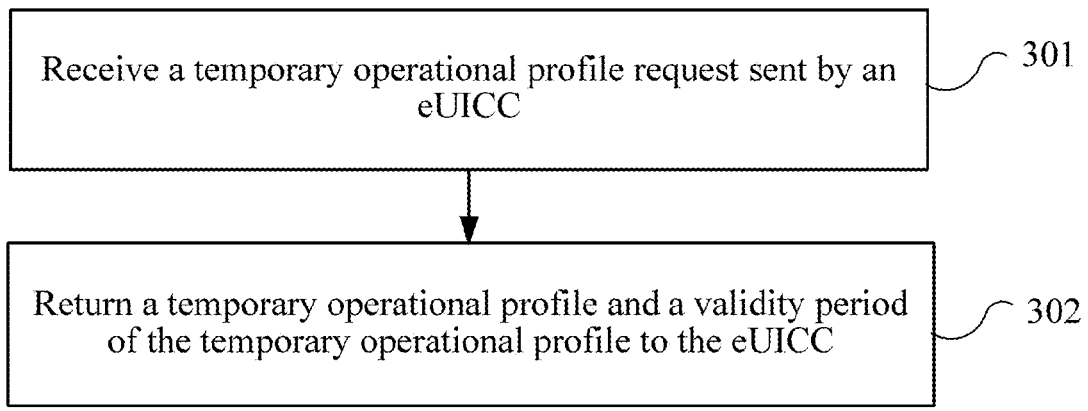
FIG. 3 is a schematic flowchart illustrating another embodiment of a method for switching between networks according to the present invention.

FIG. 3 is a schematic flowchart illustrating another embodiment of a method for switching between networks according to the present invention. The method is executed by a remote management platform, and as shown in FIG. 3, the method may include the following steps:

301: Receive a temporary OP request sent by an eUICC.

The remote management platform of a second operator network receives the temporary OP request sent by the eUICC, where the temporary OP request is sent by the eUICC according to a notification sent by a UE to indicate that a signal of a first operator network is lost. In a specific implementation, the eUICC instructs the UE to send the temporary OP request to an SM-SR in the remote management platform, and then the SM-SR forwards the request to an SM-DP in the remote management platform.

Optionally, the temporary OP request may carry first indication information, so that the remote management platform determines a validity period of a temporary OP according to the first indication information; and the first indication information may be reason information for sending the temporary OP request, for example, the reason information may be loss of current network coverage or roaming.

302: Return a temporary OP and a validity period of the temporary OP to the eUICC.

For example, the remote management platform returns a temporary OP response to the eUICC, where the response carries a temporary OP and a validity period of the temporary OP that are allocated to the eUICC. Within the validity period, the eUICC can access the second operator network using the temporary OP; after the validity period elapses, the eUICC cannot continue to use the second operator network using the temporary OP.

Optionally, the validity period is determined according to the first indication information, for example, when the first indication information is reason information for requesting a temporary OP and the reason for the request is loss of current network coverage, the validity period may be shorter than when the reason for the request is roaming.

The temporary OP and the validity period of the temporary OP are allocated by the SM-DP in the remote management platform. The SM-DP sends the information to the SM-SR, and then the SM-SR forwards the information to the eUICC. The eUICC accesses the second operator network using the temporary OP. In addition, the eUICC further instructs the UE to detect signal strength of the first operator network, and if a signal of the first operator network that the eUICC instructs the UE to detect is recovered before the validity period expires, the eUICC re-accesses the first operator network.

Embodiment 3

Figure 4:
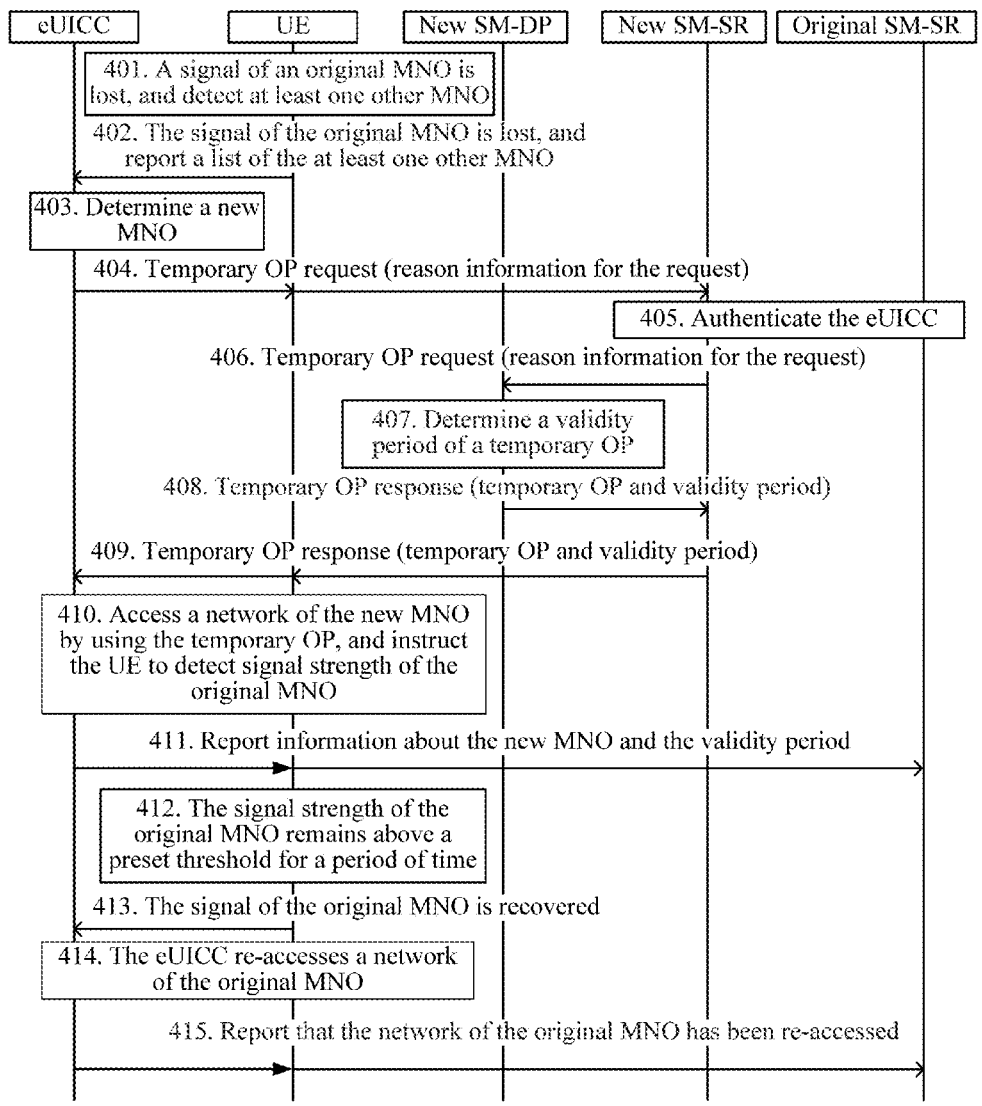
FIG. 4 is a schematic signaling flowchart for still another embodiment of a method for switching between networks according to the present invention.

FIG. 4 is a schematic signaling flowchart for still another embodiment of a method for switching between networks according to the present invention. In this embodiment, a remote management platform is split into an SM-SR and an SM-DP, and a detailed description is provided of how the two units participate in network switching in this embodiment; as an example, a temporary OP request carries first indication information, where the first indication information is reason information for sending the request. In addition, in FIG. 4, an original MNO network represents a first operator network, and a new MNO network represents a second operator network.

As shown in FIG. 4, the method may include the following steps:

401: A UE detects that a signal of a first operator network is lost, and detects at least one other available MNO.

402: The UE sends, to an eUICC, a notification that a signal of the first operator network is lost, and further reports a list of the detected at least one other available MNO to the eUICC.

403: The eUICC determines a second operator network detected by the UE.

The eUICC selects one MNO from the list of at least one other available MNO reported by the UE. The MNO is referred to as the second operator network, and will be used by the UE to perform communication.

404: The eUICC instructs the UE to send a temporary OP request to an SM-SR (which is referred to as a new SM-SR) in a remote management platform of the second operator network, where the request carries reason information for the request.

The UE sends the temporary OP request to the new SM-SR according to the instruction of the eUICC; and the carried reason information for the request, for example, is loss of current network coverage or roaming.

In addition, the request further carries the following information: an integrated circuit card identity (ICCID), where the ICCID is equivalent to a unique identifier of the eUICC; and further carries an international mobile subscriber identity (IMSI), or an identifier of the SM-SR of the first operator network, which may be referred to as an identifier (ID) of the original SM-SR; and further carries authorization data and a temp use indication.

405: The new SM-SR in the remote management platform authenticates the eUICC.

The new SM-SR may send an authentication request message to the original SM-SR according to the IMSI or the ID of the original SM-SR carried in the temporary OP request, to request the original SM-SR to authenticate the eUICC, where the authentication request message carries the authorization data, the ICCID, or the IMSI.

The original SM-SR authenticates the eUICC according to the information added by the new SM-SR to the authentication request message, including authenticating validity of the eUICC using the authorization data. A result of the eUICC authentication performed by the original SM-SR is sent by the original SM-SR to the new SM-SR. If the authentication succeeds, it indicates that the eUICC is valid and is allowed to temporarily access the second operator network, and step 406 is performed; or if the authentication fails, the new SM-SR rejects an access request of the eUICC.

Moreover, the original SM-SR provides a profile installer credential for the new SM-SR, where the profile installer credential is unique for each eUICC and is used by the new SM-SR to encrypt a temporary OP that is to be sent to the eUICC. After the temporary OP is encrypted using the profile installer credential and then sent to the eUICC, the temporary OP can be correctly decrypted by the eUICC, and the temporary OP after decryption is installed in the eUICC.

406: The new SM-SR forwards the temporary OP request to a new SM-DP in the remote management platform, where the request carries the reason information for the request.

The new SM-SR forwards the temporary OP request to the new SM-DP, to request the new SM-DP to allocate a temporary OP. The temporary OP request further carries the ICCID that is used to uniquely identify the eUICC, so that the SM-DP learns to which eUICC a temporary OP is allocated to.

407: The new SM-DP in the remote management platform determines a validity period of a temporary OP.

The new SM-DP may determine the corresponding validity period according to the reason information for the request; for example, if the reason for the request is loss of current network coverage, the validity period may be shorter than if the reason for the request is roaming.

408: The new SM-DP returns a temporary OP response to the new SM-SR, where the temporary OP response carries a temporary OP and a validity period of the temporary OP.

409: The new SM-SR forwards the temporary OP response and the carried information to the eUICC.

The new SM-SR sends the temporary OP response to the UE, and the UE forwards the temporary OP response and the carried information, such as the temporary OP and its validity period, to the eUICC.

410: The eUICC instructs the UE to detect signal strength of the first operator network, and access the second operator network using the received temporary OP.

The eUICC may send the signal strength detection instruction to the UE at receipt of the temporary OP response. The accessing the second operator network may be implemented as follows: the eUICC instructs the UE to access the second operator network using the temporary OP.

411: The eUICC reports information about the second operator network and the validity period to the original SM-SR.

The information about the second operator network, for example, is an identifier of the second operator network or the temporary OP; and the validity period is the validity period of the temporary OP allocated by the new SM-DP.

412: The UE detects the signal strength of the first operator network, and discovers the signal strength to remain above a preset threshold for a period of time.

Optionally, the preset threshold and the threshold exceeding duration may be set in the UE in advance, or be sent to the UE by the eUICC when instructing the UE to detect the signal strength of the first operator network.

413: The UE sends, to the eUICC, a notification that the signal of the first operator network is recovered.

414: The eUICC re-accesses the first operator network.

The eUICC deactivates the temporary OP allocated by the second operator network, activates an OP of the first operator network, and instructs the UE to re-access the first operator network using an OP of the first operator network.

415: The eUICC reports to the original SM-SR that the first operator network has been re-accessed.

The eUICC is registered with the first operator network, and only temporarily uses the second operator network. Therefore, a latest state of the eUICC needs to be reported to the first operator network. In a specific implementation, the eUICC reports to the SM-SR of the first operator network, which is referred to as the original SM-SR, and notifies the original SM-SR that the eUICC re-accesses the first operator network.

Embodiment 4

Figure 5:
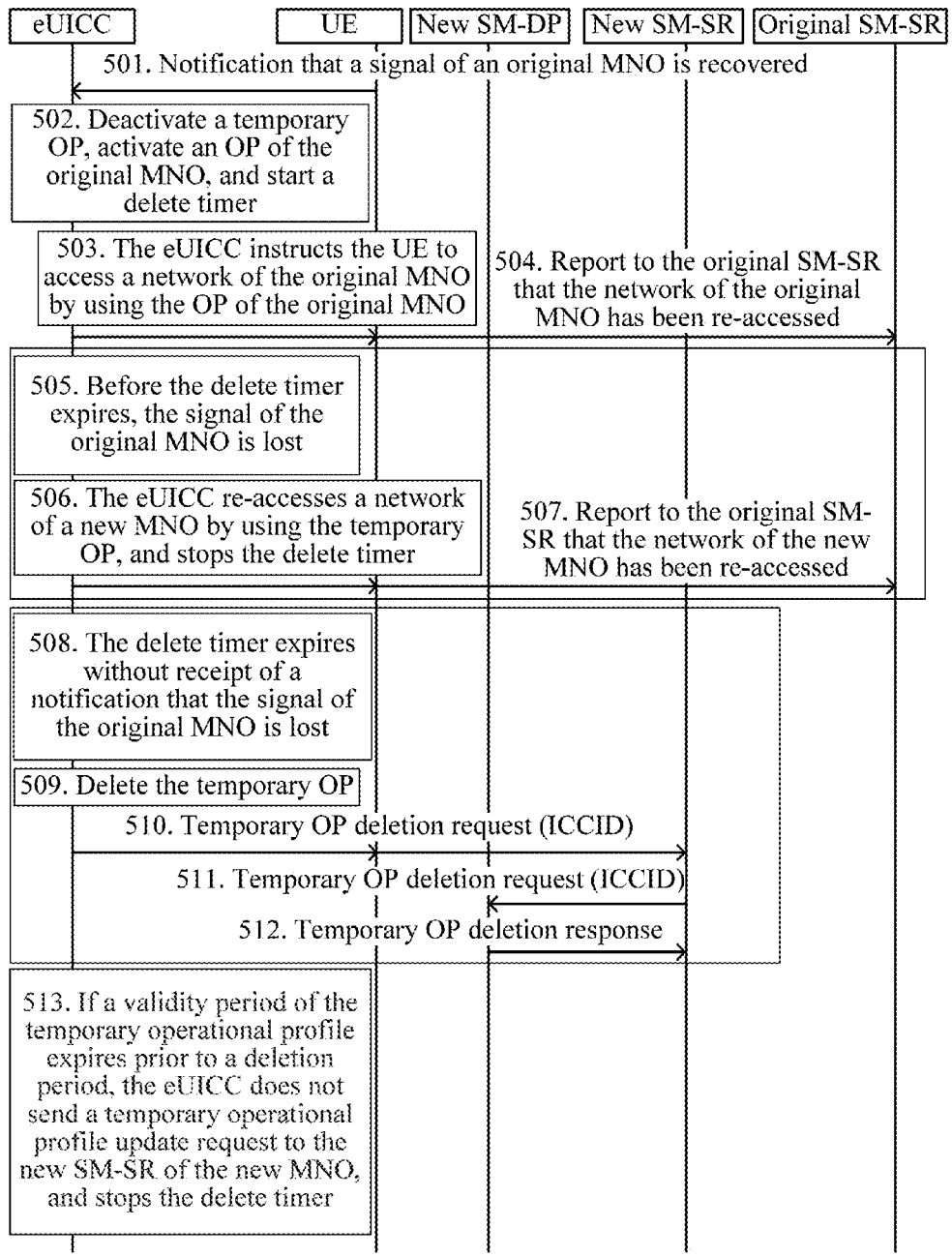
FIG. 5 is a schematic signaling flowchart for still another embodiment of a method for switching between networks according to the present invention.

FIG. 5 is a schematic signaling flowchart for still another embodiment of a method for switching between networks according to the present invention. This embodiment mainly describes several cases that may occur after an eUICC switches back to a first operator network. Steps performed before the eUICC switches back to the first operator network are not described in this embodiment, because these steps are the same as those in FIG. 4, and reference may be made to FIG. 4.

As shown in FIG. 5, the method may include the following steps:

501: An eUICC receives from a UE a notification that a signal of a first operator network is recovered.

502: The eUICC activates an OP of the first operator network, deactivates a temporary OP allocated by a second operator network, and starts a delete timer.

The delete timer is used to set a deletion period required for detecting whether the first operator network is stable; for example, if a network signal of the first operator network is not lost within the deletion period set by the delete timer, it may be considered that the network signal of the first operator network is already stable; or if the network signal of the first operator network is unstable, the signal of the first operator network may be lost within the deletion period.

503: The eUICC instructs the UE to re-access the first operator network using the OP of the first operator network.

504: The eUICC reports to an SM-SR of the first operator network (an original SM-SR) that the eUICC has re-accessed the network of the original MNO.

Afterwards, three cases may occur, where steps 505 to 507 describe a case in which the first operator network is unstable, steps 508 to 512 describe a case in which the first operator network remains stable, and step 513 describes a case in which it is still uncertain whether the first operator network is stable.

505: Before both a deletion period and a validity period of the temporary OP elapse, the eUICC receives from the UE a notification that the signal of the first operator network is lost.

After the eUICC returns to the first operator network, the first operator network may probably be unstable. Therefore, there is a likelihood that before both the deletion period and the validity period of the temporary OP of the second operator network elapse, the UE detects that the signal of the first operator network is lost-deletion period.

506: The eUICC re-accesses the second operator network using the temporary OP, and stops the delete timer.

The eUICC deactivates the OP of the first operator network, activates the temporary OP of the second operator network, and instructs the UE to re-access the second operator network using the temporary OP.

507: The eUICC reports to the original SM-SR that the eUICC re-accesses the second operator network.

508: When the deletion period elapses while the temporary OP is valid, the eUICC does not receive from the UE a notification that the signal of the first operator network is lost.

509: The eUICC deletes the temporary OP allocated by the second operator network and stored by the eUICC.

510: The eUICC sends a temporary OP deletion request to a new SM-SR in a remote management platform of the second operator network.

This case indicates that the network signal of the first operator network is already stable, the temporary OP of the second operator network does not need to be used any longer, and the eUICC may request the remote management platform of the second operator network to delete the temporary OP allocated to the eUICC; and the temporary OP deletion request carries an identifier ICCID of the eUICC, so that the remote management platform of the second operator network may find, according to the ICCID, a temporary OP corresponding to the ICCID and delete the temporary OP.

In addition, optionally, before the validity period of the temporary OP expires, if the new SM-SR does not receive a temporary OP update request sent by the eUICC, the new SM-SR infers by default that the eUICC will no longer use the temporary OP, and deletes the temporary OP. In which case, the eUICC may not send a temporary OP deletion request to the new SM-SR, and the new SM-SR instructs a new SM-DP to delete the temporary OP after the validity period of the temporary OP expires.

511: The new SM-SR sends the temporary OP deletion request to the new SM-DP, where the temporary OP deletion request carries the ICCID.

512: The new SM-DP deletes the corresponding temporary OP, and returns a temporary OP deletion response to the new SM-SR.

The new SM-DP finds, according to the ICCID carried in the temporary OP deletion request, the temporary OP corresponding to the ICCID, and deletes the temporary OP. Previously, when the eUICC requests a temporary OP from the SM-DP, the sent temporary OP request carries an identifier of the eUICC, that is, the ICCID; and correspondingly, when the new SM-DP allocates a temporary OP to the eUICC, correspondence between the temporary OP allocated by the new SM-DP and the eUICC is already recorded.

513: If the validity period of the temporary OP expires prior to the deletion period, the eUICC does not send a temporary OP update request to the new SM-SR of the second operator network, and stops the delete timer.

In this case, it is still uncertain whether the first operator network is stable; if the eUICC does not send a temporary OP update request to the new SM-SR at expiration of the validity period of the temporary OP, the temporary OP expires and becomes invalid; if the new SM-SR does not receive a temporary OP update request from the eUICC at expiration of the validity period of the temporary OP, the new SM-SR infers by default that the eUICC will no longer use the temporary OP, and deletes the temporary OP; if the UE detects, after the temporary OP becomes invalid, that the network signal of the first operator network is lost, the eUICC needs to repeat the procedure, shown in FIG. 4, of requesting to download a temporary OP.

Embodiment 5

Figure 6:
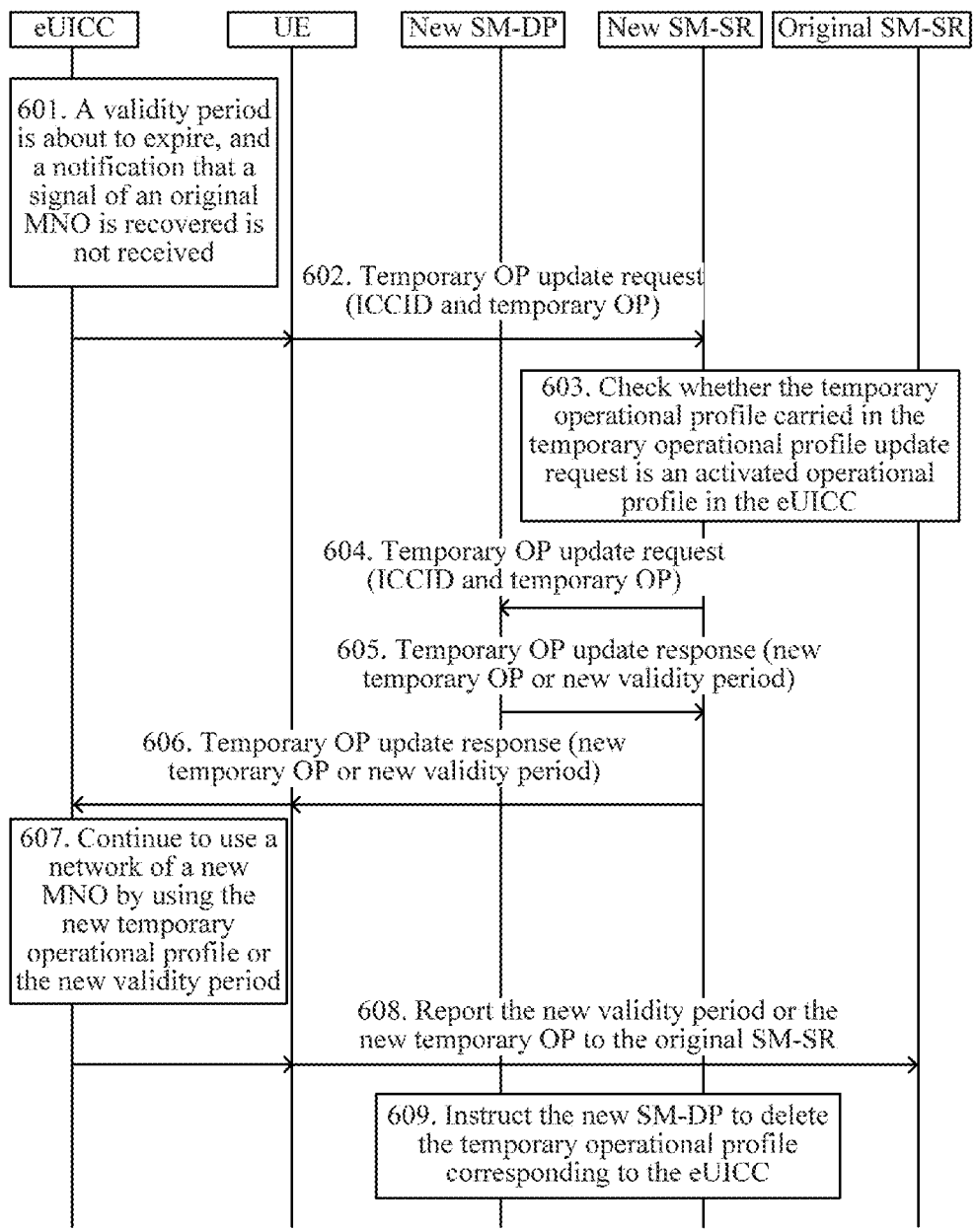
FIG. 6 is a schematic signaling flowchart for still another embodiment of a method for switching between networks according to the present invention.

FIG. 6 is a schematic signaling flowchart for still another embodiment of a network handover method according to the present invention. This embodiment describes a case in which a UE detects that a first operator network is not recovered within a validity period of a temporary OP. This embodiment starts by describing steps performed after step 411 in FIG. 4, to be specific, steps performed after the eUICC receives the temporary OP and the validity period and instructs the UE to detect a signal of the first operator network. Previous steps are the same as in FIG. 4, and reference may be made to FIG. 4.

As shown in FIG. 6, the method may include the following steps:

601: A validity period of a temporary OP is about to expire, and an eUICC does not receive from a UE a notification that a signal of a first operator network is recovered.

602: Before the validity period expires, the eUICC sends a temporary OP update request to a new SM-SR in a remote management platform of a second operator network.

The temporary OP update request carries an identifier of the eUICC, that is, an ICCID, and information about the temporary OP used by the eUICC.

603: The new SM-SR checks whether the temporary OP carried in the temporary OP update request is an activated OP in the eUICC.

The new SM-SR obtains the activated OP in the eUICC from an original SM-SR, because the eUICC is registered with the first operator network and its latest states are all reported to the original SM-SR in the remote management platform of the first operator network; and the OP in the activated state is an OP currently used by the eUICC.

If the temporary OP carried in the received temporary OP update request is the same as the activated OP obtained from the original SM-SR, it indicates that the eUICC is authorized, and steps 604 to 608 are performed; or otherwise, it indicates that the eUICC send the temporary OP update request is may be an impostor, and step 609 is performed.

604: The new SM-SR forwards the temporary OP update request to a new SM-DP.

605: The new SM-DP returns a temporary OP update response to the new SM-SR, where the temporary OP update response carries an allocated new temporary OP or new validity period.

The new SM-DP allocates a new temporary OP, or allocates a new validity period of the temporary OP to the eUICC; when a new validity period is allocated, the eUICC continues to use the originally allocated temporary OP, in other words, the eUICC extends the validity period; or when a new temporary OP is allocated, the eUICC needs to re-access a second operator network using the new temporary OP, and needs to allocate a validity period of the new temporary OP.

606: The new SM-SR forwards the temporary OP update response to the eUICC.

The new SM-SR sends the temporary OP update response to the UE, and the UE sends the response to the eUICC, where the response carries the new temporary OP or the new validity period.

607: The eUICC continues to use the second operator network using the new temporary OP or according to the new validity period.

When the new validity period is allocated, the eUICC continues to use the originally allocated temporary OP over the new validity period, which is equivalent to extending the validity period; or when the new temporary OP is allocated, the eUICC instructs the UE to re-access the second operator network using the new temporary OP.

608: The eUICC reports the new validity period or the new temporary OP to the original SM-SR.

At expiration of the validity period of the original temporary OP, if the original SM-SR does not receive the new validity period or the new temporary OP sent by the eUICC, the original SM-SR sets a state of the eUICC to an unreachable state, where the unreachable state indicates that the original SM-SR does not know the latest state of the eUICC.

609: The new SM-SR instructs the new SM-DP to delete the temporary OP corresponding to the eUICC.

The new SM-SR sends a temporary OP deletion request to the new SM-DP to instruct the new SM-DP to delete the temporary OP, where the request carries the identifier ICCID of the eUICC; and the new SM-DP deletes the corresponding temporary OP according to the ICCID, and returns a temporary OP deletion response to the new SM-SR.

In addition, before the validity period of the temporary OP expires, if the new SM-SR does not receive a temporary OP update request sent by the eUICC, the new SM-SR infers by default that the eUICC will no longer use the temporary OP, and deletes the temporary OP.

Embodiment 6

Figure 7:
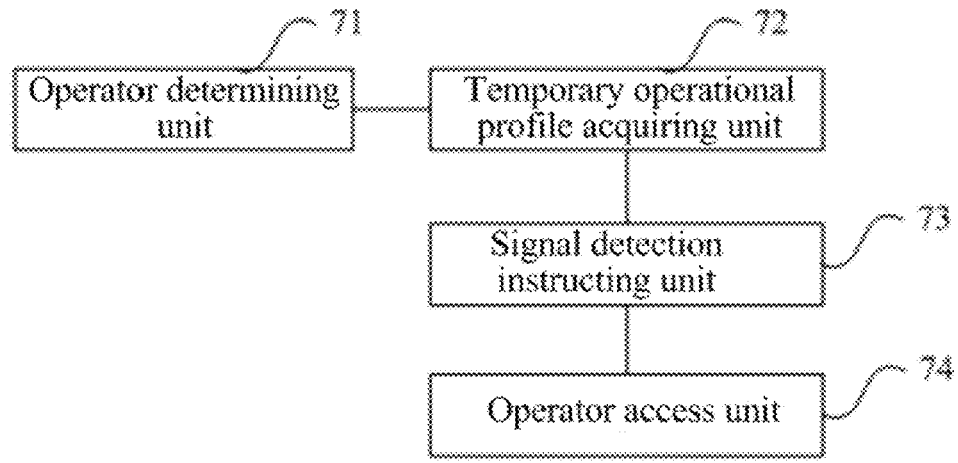
FIG. 7 is a schematic structural diagram depicting an embodiment of an eUICC according to the present invention.

FIG. 7 is a schematic structural diagram depicting an embodiment of an eUICC according to the present invention. The eUICC may execute the method in any embodiment of the present invention, and as shown in FIG. 7, the eUICC may include an operator determining unit 71, a temporary OP acquiring unit 72, a signal detection instructing unit 73, and an operator access unit 74, where the operator determining unit 71 is configured to, when a notification that a signal of a first operator network is lost is received from a UE, determine an available second operator network; the temporary OP acquiring unit 72 is configured to send a temporary OP request to a remote management platform of the second operator network, and receive a temporary OP and a validity period of the temporary OP that are returned by the remote management platform; optionally, the temporary OP request may carry first indication information, where the first indication information, for example, is reason information for sending the temporary OP request; the signal detection instructing unit 73 is configured to instruct the UE to detect signal strength of the first operator network; and the operator access unit 74 is configured to access the second operator network using the temporary OP; and is further configured to, before the validity period of the temporary OP expires, if it is determined according to the signal strength of the first operator network that the signal of the first operator network is recovered, re-access the first operator network.

Further, the temporary OP acquiring unit 72 is configured to, when the validity period expires without the operator determining unit receiving a notification from the UE that the signal of the first operator network is recovered, send a temporary OP update request to the remote management platform; and receive a temporary OP update response returned by the remote management platform, where the temporary OP update response carries a new temporary OP or a new validity period that is allocated by the remote management platform; and the operator access unit 74 is further configured to continue to use the second operator network using the new temporary OP or according to the new validity period.

The operator access unit 74 is further configured to, after the validity period of the temporary OP expires, if it is determined according to the signal strength of the first operator network that the signal of the first operator network is recovered, re-access the first operator network.

Figure 8:
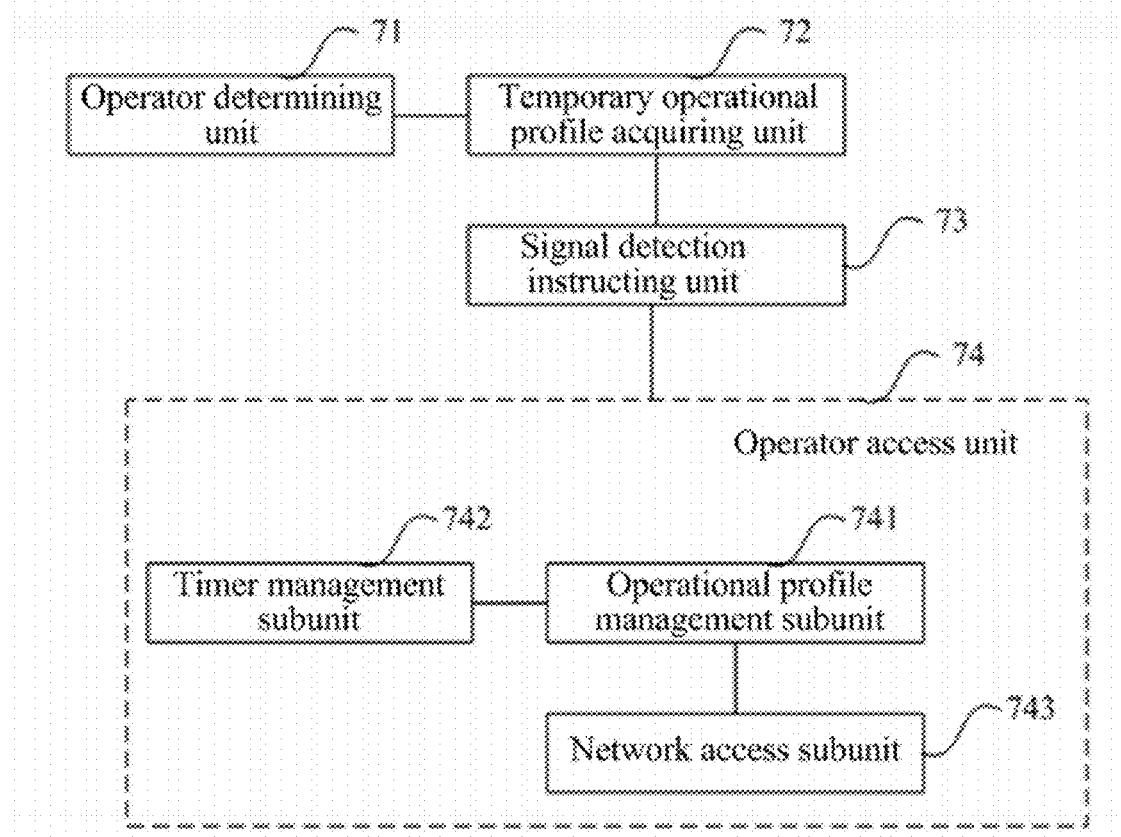
FIG. 8 is a schematic structural diagram depicting another embodiment of an eUICC according to the present invention.

FIG. 8 is a schematic structural diagram depicting another embodiment of an eUICC according to the present invention. Based on the structure shown in FIG. 7, the operator access unit 74 in the eUICC may include an OP management subunit 741, a timer management subunit 742, and a network access subunit 743, where the OP management subunit 741 is configured to activate an OP of the first operator network, and deactivate the temporary OP allocated by the second operator network; the timer management subunit 742 is configured to start a delete timer, where the delete timer is used to set a deletion period required for detecting whether the first operator network is stable; and the network access subunit 743 is configured to re-access the first operator network using the OP of the first operator network.

Further, the operator determining unit 71 is configured to, before both the deletion period and the validity period of the temporary OP expire, receive a notification from the UE that the signal of the first operator network is lost; the OP management subunit 741 is further configured to deactivate the OP of the first operator network, and activate the temporary OP allocated by the second operator network; the network access subunit 743 is further configured to re-access the second operator network using the temporary OP; and the timer management subunit 742 is further configured to stop the delete timer.

Further, the OP management subunit 741 is configured to, if the deletion period expires but the validity period of the temporary OP does not expire, and if the operator determining unit does not receive a notification from the UE that the signal of the first operator network is lost, delete the temporary OP allocated by the second operator network and stored by the eUICC; and the temporary OP acquiring unit 72 is further configured to send a temporary OP deletion request to the remote management platform of the second operator network, to instruct the remote management platform to delete the temporary OP.

Further, the temporary OP acquiring unit 72 is configured to, when the validity period of the temporary OP expires prior to the deletion period, send no temporary OP update request to the remote management platform of the second operator network; and the timer management subunit 742 in the operator access unit is further configured to stop the delete timer.

Embodiment 7

Figure 9:
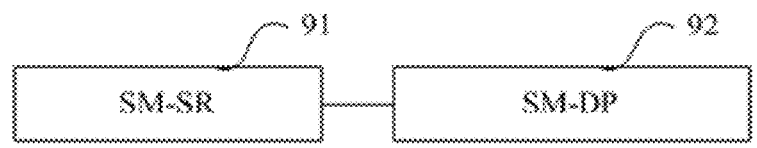
FIG. 9 is a schematic structural diagram depicting an embodiment of a remote management platform according to the present invention.

FIG. 9 is a schematic structural diagram depicting an embodiment of a remote management platform according to the present invention. The remote management platform may execute the method in any embodiment of the present invention, and as shown in FIG. 9, the remote management platform may include a SM-SR 91, and a SM-DP 92, where, the SM-SR 91 is configured to receive a temporary OP request sent by an eUICC, where the temporary OP request is sent by the eUICC according to a notification sent by a UE to indicate to the eUICC that a signal of a first operator network is lost; and forward the temporary OP request to the SM-DP; and the SM-DP 92 is configured to return a temporary OP and a validity period of the temporary OP to the eUICC through the SM-SR, so that the eUICC accesses a second operator network using the temporary OP, and if a signal of the first operator network that the eUICC instructs the UE to detect is recovered before the validity period elapses, re-accesses the first operator network.

Further, the temporary OP request sent by the eUICC and received by the SM-SR carries first indication information; and the SM-DP is further configured to, before returning the validity period of the temporary OP to the eUICC, determine the validity period of the temporary OP according to the first indication information. For example, the first indication information includes: reason information for sending the temporary OP request.

Further, the SM-SR 91 is configured to receive a temporary OP update request sent by the eUICC, where the temporary OP update request is sent by the eUICC when the validity period elapses without receipt of a notification from the UE that the signal of the first operator network is recovered, and forward the temporary OP update request to the SM-DP; and the SM-DP 92 is configured to allocate a new temporary OP or a new validity period to the eUICC, add the new temporary OP or the new validity period to a temporary OP update response, and return the temporary OP update response to the eUICC through the SM-SR, so that the eUICC continues to use the second operator network using the new temporary OP or according to the new validity period.

Further, the temporary OP update request carries the temporary OP; and the SM-SR 91 is further configured to, after receiving the temporary OP update request sent by the eUICC, check whether the temporary OP carried in the temporary OP update request is an activated OP in the eUICC; and if yes, forward the temporary OP update request to the SM-DP; or if no, instruct the SM-DP to delete the temporary OP.

Further, the SM-SR 91 is configured to receive a temporary OP deletion request sent by the eUICC, where the temporary OP deletion request is sent by the eUICC when a deletion period elapses on the eUICC side without receipt of a notification from the UE that the signal of the first operator network is lost; and forward the temporary OP deletion request to the SM-DP; and the SM-DP 92 deletes, according to the temporary OP deletion request, the temporary OP corresponding to the eUICC.

Embodiment 8

Figure 10:
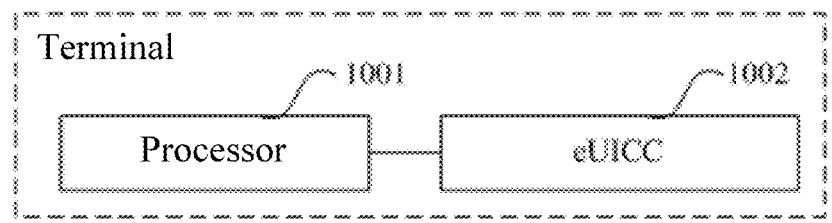
FIG. 10 is a schematic structural diagram depicting an embodiment of a UE according to the present invention.

FIG. 10 is a schematic structural diagram depicting an embodiment of a UE according to the present invention. The UE may execute the method in any embodiment of the present invention, and the UE, for example, is a mobile phone. As shown in FIG. 10, the UE may include a processor 1001 and an eUICC 1002.

The processor 1001 is actually equivalent to a UE that communicates with the eUICC 1002 in any method embodiment of the present invention, to be specific, the UE shown in FIG. 4 to FIG. 6. For ease of description, such a UE is referred to as a UE in the method embodiments. In a specific implementation, the processor 1001 and the eUICC 1002 are both parts of the UE, where the eUICC 1002 is embedded in the UE; and the eUICC 1002 cannot directly communicate with the outside, and needs to perform communication through the processor 1001 in the UE, where the processor 1001 may perform functions such as signal detection and signal receiving and sending.

The processor 1001 is configured to send, to the eUICC, a notification that a signal of a first operator network is lost; and the eUICC 1002 is configured to determine an available second operator network according to the notification that the signal of the first operator network is lost, and send a temporary OP request to a remote management platform of the second operator network through the processor; and is further configured to receive, through the processor, a temporary OP and a validity period of the temporary OP that are returned by the remote management platform of the second operator network, instruct the processor to detect signal strength of the first operator network, and access the second operator network using the temporary OP; and before the validity period of the temporary OP elapses, if the processor determines according to the signal strength of the first operator network that the signal of the first operator network is recovered, re-access the first operator network.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for switching between networks comprising:
    determining a second operator network is available when a signal of a first operator network is lost by a user equipment (UE);
    sending a temporary operational profile (OP) request to a remote management platform of the second operator network, wherein the temporary OP request carries reason information for sending the temporary OP request;
    receiving a temporary OP and a validity period of the temporary OP from the remote management platform;
    detecting a signal strength of the first operator network;
    accessing the second operator network using the temporary OP; and
    re-accessing the first operator network before the validity period of the temporary OP expires and when the signal of the first operator network has recovered.

2. The method for switching between networks according to claim 1, wherein the validity period of the temporary OP is based on the reason information.

3. The method for switching between networks according to claim 1, wherein after detecting the signal strength of the first operator network, the method further comprises:
    sending a temporary OP update request to the remote management platform when the validity period of the temporary OP expires without receipt of a notification from the UE that the signal of the first operator network is recovered;
    receiving a temporary OP update response from the remote management platform, wherein the temporary OP update response carries a new temporary OP or a new validity period that is allocated by the remote management platform; and
    continuing to use the second operator network using the new temporary OP or according to the new validity period.

4. The method for switching between networks according to claim 1, wherein re-accessing the first operator network comprises:
    activating an OP of the first operator network;
    deactivating the temporary OP allocated by the second operator network;
    starting a delete timer, wherein the delete timer is used to set a deletion period required for detecting whether the first operator network is stable; and
    re-accessing the first operator network using the OP of the first operator network.

5. The method for switching between networks according to claim 4, wherein after starting the delete timer, the method further comprises:
    re-accessing the second operator network using the temporary OP when a notification that the signal of the first operator network is lost is received from the UE before both the deletion period and the validity period of the temporary OP expire; and
    stopping the delete timer.

6. The method for switching between networks according to claim 4, wherein after starting the delete timer, the method further comprises:
    deleting the temporary OP allocated by the second operator network when the deletion period has expired, the validity period of the temporary OP has not expired, and the signal of the first operator network has not been lost; and
    sending a temporary OP deletion request to the remote management platform, and wherein the temporary OP deletion request instructs the remote management platform to delete the temporary OP.

7. The method for switching between networks according to claim 4, wherein after starting the delete timer, the method further comprises:
    not sending a temporary OP update request to the remote management platform of the second operator network when the validity period of the temporary OP expires prior to the deletion period; and
    stopping the delete timer.

8. The method for switching between networks according to claim 1, wherein after detecting the signal strength of the first operator network, the method further comprises re-accessing the first operator network after the validity period of the temporary OP expires and when the signal of the first operator network has recovered.

9. An apparatus, comprising:
    a memory comprising instructions; and
    a processor coupled to the memory, wherein the processor, when executing the instructions, is configured to:
        determine a second operator network is available when a signal of a first operator network is lost by a user equipment (UE);
        send a temporary OP request to a remote management platform of the second operator network;
        receive a temporary OP and a validity period of the temporary OP from the remote management platform;
        detect a signal strength of the first operator network;
        access the second operator network using the temporary OP;
        re-access the first operator network before the validity period of the temporary OP expires and when that the signal of the first operator network has recovered;

send a temporary OP update request to the remote management platform when the validity period expires and the signal of the first operator network has not recovered;
receive a temporary OP update response from the remote management platform, wherein the temporary OP update response carries a new temporary OP or a new validity period that is allocated by the remote management platform; and
continue to use the second operator network using the new temporary OP according to the new validity period.

10. The apparatus according to claim 9, wherein the temporary OP request carries reason information for sending the temporary OP request, and wherein the validity period of the temporary OP is based on the reason information.

11. The apparatus of claim 9, wherein re-accessing the first operator network comprises:
activating an OP of the first operator network;
deactivating the temporary OP allocated by the second operator network;
starting a delete timer, wherein the delete tinier is used to set a deletion period required for detecting whether the first operator network is stable; and
re-accessing the first operator network using the OP of the first operator network.

12. The apparatus according to claim 11, wherein the processor is further configured to;
determine that the signal of the first operator network is lost before both the deletion period and the validity period of the temporary OP expires;
deactivate the OP of the first operator network;
activate the temporary OP allocated by the second operator network;
re-access the second operator network using the temporary OP; and
stop the delete timer.

13. The apparatus according to claim 11, wherein the processor is further configured to:
delete the temporary OP allocated by the second operator network when the deletion period has expired, the validity period of the temporary OP has not expired, and the signal of the first operator network has not been lost; and
send a temporary OP deletion request to the remote management platform, wherein the temporary OP deletion request instructs the remote management platform to delete the temporary OP.

14. An apparatus, comprising:
a memory comprising instructions; and
a processor coupled to the memory, wherein the processor, when executing the instructions, is configured to:
determine a second operator network is available when a signal of a first operator network is lost by a user equipment (UE);
send a temporary operational profile (OP) request to a remote management platform of the second operator network;
receive a temporary OP and a validity period of the temporary OP from the remote management platform;
detect a signal strength of the first operator network;
access the second operator network using the temporary OP; and
re-access the first operator network before the validity period of the temporary OP expires and when the signal of the first operator network is recovered, wherein re-accessing the first operator network comprises:
activating an OP of the first operator network;
deactivating the temporary OP allocated by the second operator network;
starting a delete timer, wherein the delete timer is used to set a deletion period required for detecting whether the first operator network is stable; and
re-accessing the first operator network using the OP of the first operator network.

15. The apparatus according to claim 14, wherein the processor is further configured to:
determine that the signal of the first operator network is lost before both the deletion period and the validity period of the temporary OP expires;
deactivate the OP of the first operator network;
activate the temporary OP allocated by the second operator network;
re-access the second operator network using the temporary OP; and
stop the delete timer.

16. The apparatus according to claim 14, wherein the processor is further configured to:
delete the temporary OP allocated by the second operator network when the deletion period has expired, the validity period of the temporary OP has not expired, and the signal of the first operator network has not been lost; and
send a temporary OP deletion request to the remote management platform, wherein the temporary OP deletion request instructs the remote management platform to delete the temporary OP.

17. The apparatus according to claim 14, wherein the processor is further configured to:
not send a temporary OP update request to the remote management platform when the validity period of the temporary OP expires prior to the deletion period; and
stop the delete timer.

18. The apparatus according to claim 14, wherein the processor is further configured to re-access the first operator network after the validity period of the temporary OP expires and when the signal of the first operator network has recovered.

19. The apparatus according to claim 14, wherein the temporary OP request carries reason information for sending the temporary OP request, and wherein the validity period of the temporary OP is based on the reason information.

20. The apparatus of claim 14, wherein the processor is further configured to;
send a temporary OP update request to the remote management platform when the validity period expires and the signal of the first operator network has not recovered;
receive a temporary OP update response from the remote management platform, wherein the temporary OP update response carries a new temporary OP or a new validity period that is allocated by the remote management platform; and
continue to use the second operator network using the new temporary OP according to the new validity period.

* * * * *

UNITED STATES PATENT AND TRADEMARK OFFICE
CERTIFICATE OF CORRECTION

PATENT NO. : 9,907,001 B2  
APPLICATION NO. : 14/700966  
DATED : February 27, 2018  
INVENTOR(S) : Hui Jin and Guodong Xue Page 1 of 1

It is certified that error appears in the above-identified patent and that said Letters Patent is hereby corrected as shown below:

In the Claims

Column 21; Line 23; Claim 11 should read:
starting a delete timer, wherein the delete timer is used to Signed and Sealed this
Tenth Day of April, 2018

Andrei Iancu
*Director of the United States Patent and Trademark Office*